United States Patent

Tanahashi

[11] Patent Number: 5,460,244
[45] Date of Patent: Oct. 24, 1995

[54] ELEVATOR CONTROL APPARATUS USING PARALLEL CONVERTERS AND INVERTERS WITH MEANS TO CONTROL CIRCULATING CURRENT

[75] Inventor: Toru Tanahashi, Inazawa, Japan

[73] Assignee: Mitsubishi Denki Kabushiki Kaisha, Tokyo, Japan

[21] Appl. No.: 26,408

[22] Filed: Mar. 4, 1993

[30] Foreign Application Priority Data

Mar. 6, 1992 [JP] Japan .................... 4-049834

[51] Int. Cl.⁶ .............................. B66B 1/28; H02M 7/08
[52] U.S. Cl. ..................... 187/293; 318/434; 318/802; 363/69; 363/70; 363/65
[58] Field of Search ................... 363/37, 70, 69, 363/65, 71, 41, 98, 97, 95, 127, 131, 132; 187/116, 112, 115; 318/802, 800, 811, 434; 361/31, 93, 87; 197/287, 293, 296, 277

[56] References Cited

U.S. PATENT DOCUMENTS

| | | | |
|---|---|---|---|
| 4,363,065 | 12/1982 | Hasegawa et al. | 361/85 |
| 4,519,479 | 5/1985 | Tanahashi . | |
| 4,602,701 | 7/1986 | Tanahashi . | |
| 4,625,834 | 12/1986 | Tanahashi . | |
| 4,802,079 | 1/1989 | Mizoguchi | 363/71 |
| 4,816,985 | 3/1989 | Tanahashi | 363/81 |
| 4,849,870 | 6/1989 | Heinrich | 363/37 |
| 4,851,982 | 7/1989 | Tanahashi . | |
| 4,953,053 | 8/1990 | Pratt | 361/31 |
| 5,016,158 | 5/1991 | Matsui et al. | 363/71 |
| 5,047,909 | 9/1991 | Hosoda | 363/40 |
| 5,065,303 | 11/1991 | Nguyen et al. | 363/40 |
| 5,130,617 | 7/1992 | Oshima et al. | 318/34 |
| 5,245,525 | 9/1993 | Galloway et al. | 363/71 |
| 5,262,935 | 11/1993 | Shirahama et al. | 363/71 |
| 5,325,285 | 6/1994 | Araki | 363/71 |
| 5,390,102 | 2/1995 | Araki | 363/71 |

FOREIGN PATENT DOCUMENTS

| 323180 | 1/1989 | Japan . |
|---|---|---|
| 433573 | 2/1990 | Japan . |

Primary Examiner—Peter S. Wong
Assistant Examiner—Robert Nappi
Attorney, Agent, or Firm—Leydig, Voit & Mayer

[57] ABSTRACT

The present invention provides an elevator speed control system in one mode, including: a plurality of converters connected in parallel for converting an AC voltage to a DC voltage by means of controllable devices; a capacitor for smoothing output voltages of the plural converters; a plurality of inverters connected in parallel which convert the voltages smoothed by means of the capacitors to an AC voltage whose magnitude and frequency are controllable, and which further supply the resulting AC voltage to a hoisting induction motor; current detectors for detecting the currents in each phase of the plural converters and inverters; a control means which calculates the sum of the resulting currents of the plural converters and inverters and which further controls the output voltages of plural converters and inverters so that the resulting sum is minimized.

In another mode of the present invention, there is provided a control means which calculates the difference in phase between output voltages of the plural converters and inverters, and which stops the plural converters or inverters if the calculated phase difference exceeds a predetermined value.

In the above configurations, the reduction in output is effectively avoided by suppressing the circulating current flowing through the parallel-connected converters or inverters.

3 Claims, 7 Drawing Sheets

ELEVATOR CONTROL APPARATUS USING PARALLEL CONVERTERS AND INVERTERS WITH MEANS TO CONTROL CIRCULATING CURRENT

BACKGROUND OF THE INVENTION

1. Field of the Invention

The present invention relates to an elevator speed control system.

2. Description of the Related Art

Referring to FIG. 7, the configuration of a conventional elevator speed control system will be described. FIG. 7 shows a conventional elevator speed control system, as described, for example, in Japanese Patent Application Laid-Open No. 3-23180.

The conventional elevator speed control system shown in FIG. 7 includes: a contact 2 of an electromagnetic contactor connected to a three-phase AC power supply 1; contacts 3A and 3B of an electromagnetic contactor connected to the contact 2; a reactors 4A and 4B connected to the contacts 3A and 3B, respectively; converters 5A and 5B connected to the reactors 4A and 4B, respectively; smoothing capacitors 6A and 6B for smoothing output voltages given by the converters 5A and 5B; contacts 7A and 7B of an electromagnetic contactor for connecting the output voltages of the converters 5A and 5B in parallel; inverters 8A and 8B connected to the smoothing capacitors 6A and 6B, respectively; reactors 9A and 9B provided so as to connect to outputs of the inverters 8A and 8B, respectively; contacts 10A and 10B of an electromagnetic contactor connected to the reactors 9A and 9B, respectively.

FIG. 7 also shows an induction motor 11 connected to the contacts 10A and 10B, a speed reducer 12 connected to the induction motor 11, a sheave 13 of a hoisting machine connected to the speed reducer 12, a main rope 14 wound around the sheave 13, a car 15 connected to the main rope 14, and a counterweight 16.

The conventional elevator speed control system further includes a control circuit 17 connected to the converters 5A and 5B, and also includes a control circuit 18 connected to the inverter 8A and 8B.

Now, operation of the conventional elevator speed control system will be described. When an elevator is given an operation instruction, the electromagnetic contactor is excited to close the contacts 2, 3A, and 3B, thus the three-phase AC power supply 1 is connected to the converters 5A and 5B via the reactors 4A and 4B. Using PWM modulation, the converters 5A and 5B control the voltages across the capacitors 6A and 6B to maintain a certain DC voltage. The contacts 7A and 7B of the electromagnetic contactor are also closed so that the capacitors 6A and 6B are connected in parallel with each other and so that converters 5A and 5B operate in parallel.

Using PWM modulation, the inverters 8A and 8B, operating in parallel, convert the DC voltage to an AC voltage whose magnitude and frequency are controllable. Then, the converted AC voltage is supplied to the induction motor 11 via the reactors 9A and 9B, and via the contacts 10A and 10B. The output of the induction motor 11 is reduced by the speed reducer 12 to move the car 15 and the counterweight 16 by rotating the sheave 13.

In the conventional elevator speed control system as in the above description, when parallel operation is carried out via reactors between the converter 5A and converter 5B or between the inverter 8A and inverter 8B, circulating current flows through the parallel-connected converters or inverters, thus causing a reduction in output.

SUMMARY OF THE INVENTION

In view of the above problem, it is an object of the present invention to provide an elevator speed control system in which the reduction in output is avoided by suppressing the circulating current flowing through the parallel-connected converters or inverters.

An elevator speed control system in a first mode of the present invention includes: a plurality of converters connected in parallel for converting an AC voltage to a DC voltage by means of controllable devices; a capacitor for smoothing output voltages of the plural converters; a plurality of inverters connected in parallel which convert the voltages smoothed by means of the capacitors to an AC voltage whose magnitude and frequency are controllable, and which further supply the resulting AC voltage to a hoisting induction motor; current detectors for detecting the currents in each phase of the plural converters and inverters; a control means which calculates the sum of the resulting currents of the plural converters and inverters and which further controls the output voltages of plural converters and inverters so that the resulting sum is minimized.

An elevator speed control system in a second mode of the present invention includes: a plurality of converters connected in parallel for converting an AC voltage to a DC voltage by means of controllable device; a capacitor for smoothing output voltages of the plural converters; a plurality of inverters connected in parallel which convert the voltages smoothed by means of the capacitors to an AC voltage whose magnitude and frequency are controllable, and which further supply the resulting AC voltage to a hoisting induction motor; a control means which calculates the difference in phase between output voltages of the plural converters and inverters, and which stops the plural converters or inverters if the calculated phase difference exceeds a predetermined value.

DESCRIPTION OF THE PREFERRED EMBODIMENTS

The following description deals with embodiments in accordance with the present inventions.

Figure 1:
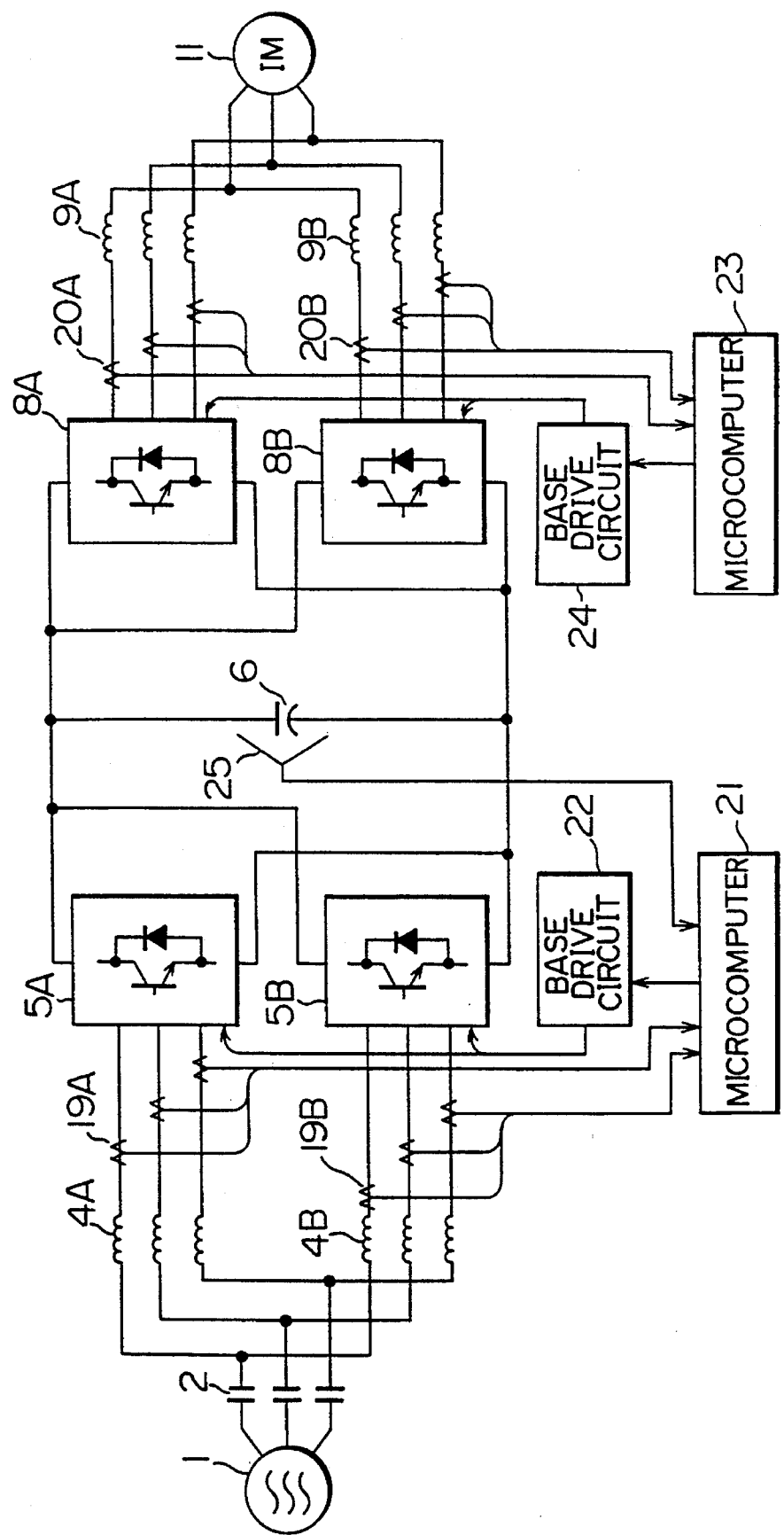
FIG. 1 is a block diagram showing an elevator speed control system in accordance with a first embodiment of the present invention.

FIRST EMBODIMENT:

Referring to FIG. 1, in a first embodiment in accordance with the present invention, contacts 2 of an electromagnetic contactor are connected to each phase of a three-phase AC power supply 1, and each contact 2 is connected to a converter 5A via a reactor 4A and also to a converter 5B via a reactor 4B. Output terminals of the converters 5A and 5B are connected to a smoothing capacitor 6 which is commonly used for both the converters 5A and 5B. The output terminals of the converters 5A and 5B are also connected to both inverters 8A and 8B in parallel. Output terminals of the inverters 8A and 8B are connected to an induction motor 11 via reactors 9A and 9B.

Converters 5A and 5B are connected to current detectors 19A and 19B for detecting a current flowing through each phase. These current detectors 19A and 19B are connected to a microcomputer 21. The microcomputer 21 is connected to a base driving circuit 22 for supplying a base signal to the converters 5A and 5B, and also connected to a voltage detector 25 for detecting a voltage across the smoothing capacitor 6. On the other hand, inverters 8A and 8B are connected to current detectors 20A and 20B for detecting a current flowing through each phase. These current detectors 20A and 20B are connected to a microcomputer 23. The microcomputer 23 is connected to a base driving circuit 24 for supplying a base signal to the converters 5A and 5B.

Figure 7:
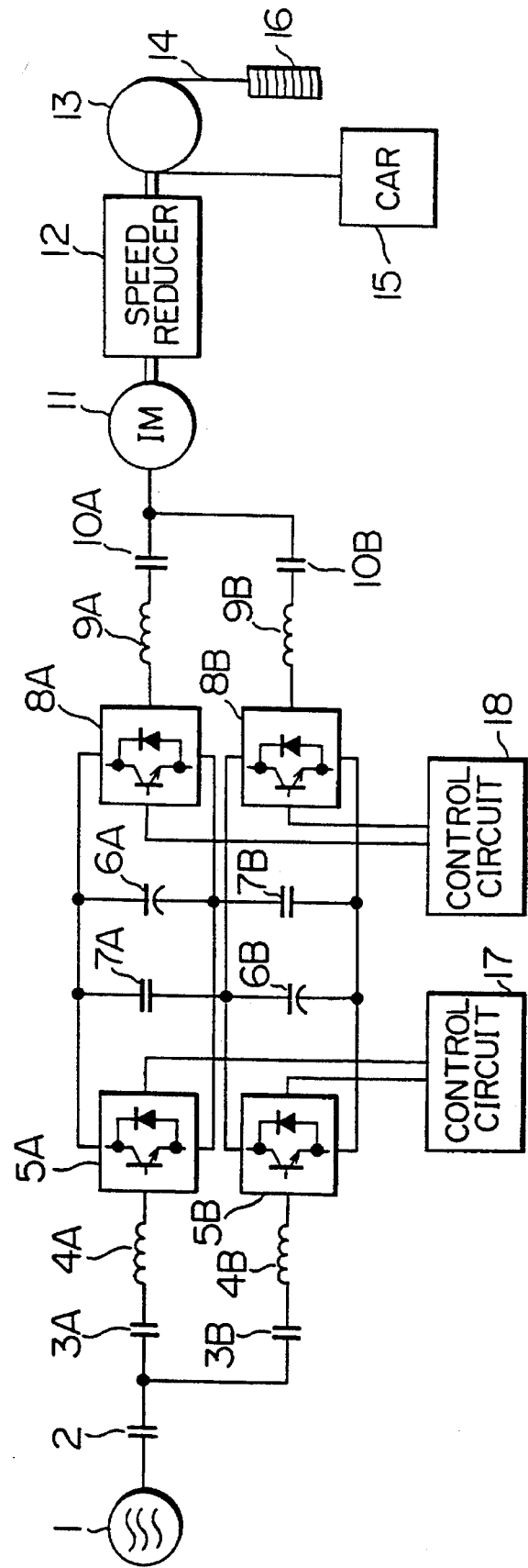
FIG. 7 is a block diagram showing a conventional elevator speed control system.

The induction motor 11 is connected to a speed reducer, sheave, main rope, car, and counterweight, which are similar to those shown in FIG. 7, although these are not shown in FIG. 1 for simplicity.

In general, when an induction motor is controlled by using inverters 8A and 8B as in this first embodiment, vector control is used to achieve accurate and quick response. In the vector control, the current flowing through the induction motor 11 is divided into two components, that is, excitation current and torque current which are controlled separately. Currents flowing in each phase, $i_U$, $i_V$, and $i_W$, and excitation current $i_d$, and torque current $i_q$ have relationship described by the following equation (1):

$$\begin{pmatrix} i_d \\ i_q \end{pmatrix} = \sqrt{2/3} \begin{pmatrix} \cos\theta & \cos(\theta+2\pi/3) & \cos(\theta-2\pi/3) \\ \sin\theta & \sin(\theta+2\pi/3) & \sin(\theta-2\pi/3) \end{pmatrix} \begin{pmatrix} i_u \\ i_v \\ i_w \end{pmatrix} \quad (1)$$

where, $\theta$ is a phase of a rotating coordinate system and phase U.

Figure 2:
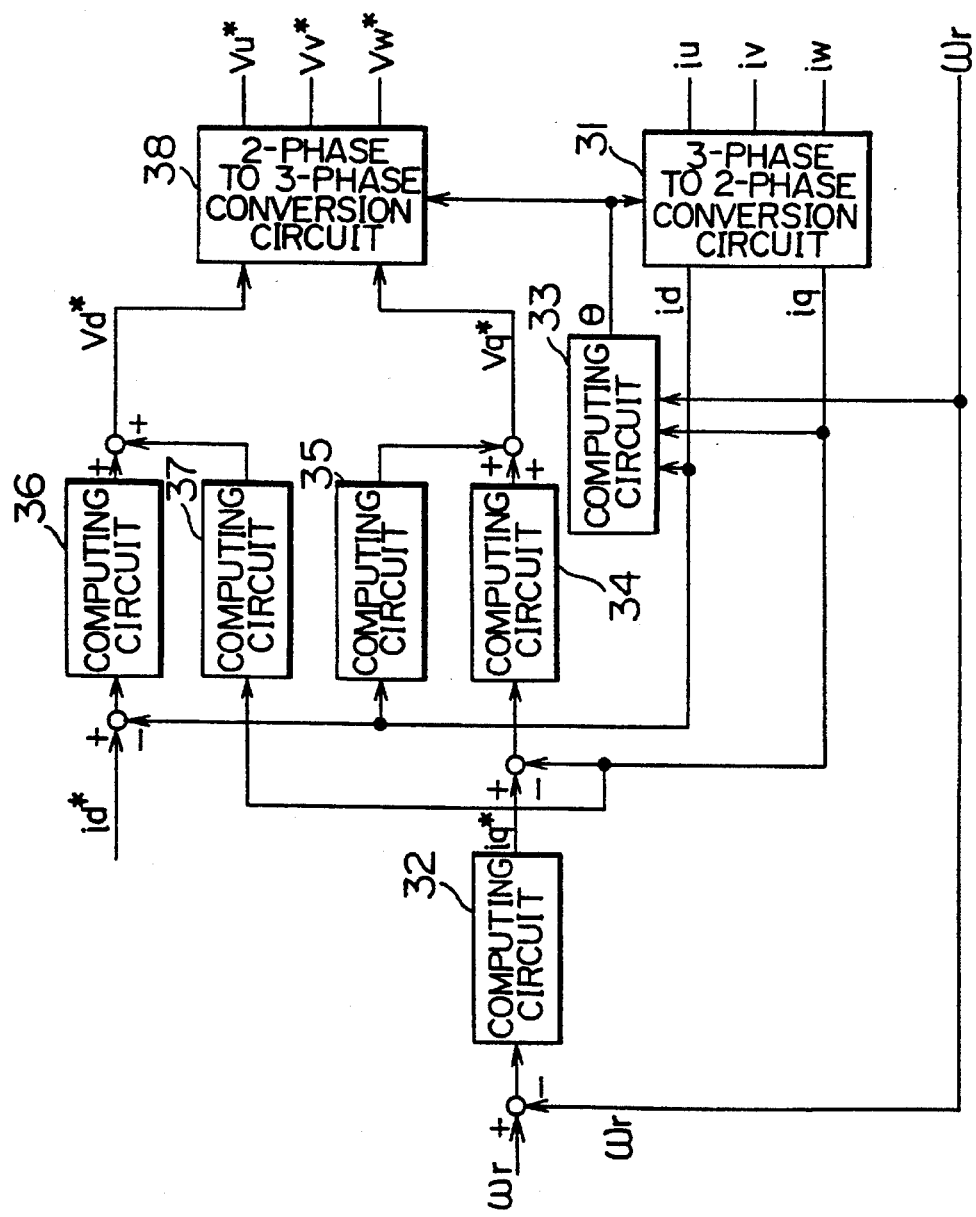
FIG. 2 shows a calculation block diagram which the first embodiment is based on, and which will be modified in a final more suitable form.

FIG. 2 is a block diagram showing an example of control of the induction motor 11 by means of conversion from three phase to two phase in accordance with equation (2). In FIG. 2, 3-phase-to-2-phase conversion circuit 31 converts three-phase current $i_U$, $i_V$, and $i_W$ to an excitation current component $i_d$ and a torque current component $i_q$. A computing circuit 32 performs operational amplification with respect to the difference between a speed instruction $w_r^*$ and generates a torque current instruction $i_q^*$. A computing circuit 33 calculates an output phase-angle $\theta$ of the inverter from the excitation current component $i_d$, the torque current component $i_q$, and a speed $w_r$.

A computing circuit 34 generates a voltage instruction by calculating the difference between the torque current instruction $i_q^*$ and the torque current component $i_q$. This resultant voltage instruction is added with an interference voltage between the torque current component $i_q$ and the excitation current component $i_d$ produced by a computing circuit 35, thus producing a voltage instruction $v_q^*$ having the same phase as that of the torque current component $i_q$. A computing circuit 36 generates a voltage instruction by calculating the difference between an excitation current instruction $i_d^*$ and the excitation current component $i_d$. This resultant voltage instruction is added with an interference voltage between the excitation current component $i_d$ and the torque current component $i_q$ produced by a computing circuit 37, thus producing a voltage instruction $v_d^*$ having the same phase as that of the excitation current component $i_d$.

A 2-phase-to-3-phase conversion circuit 38 performs 2-phase-to-3-phase conversion so as to produce three-phase voltage instruction $v_U^*$, $v_V^*$, and $v_W^*$ from the voltage instruction $v_q^*$ and the voltage instruction $v_d^*$.

Figure 3:
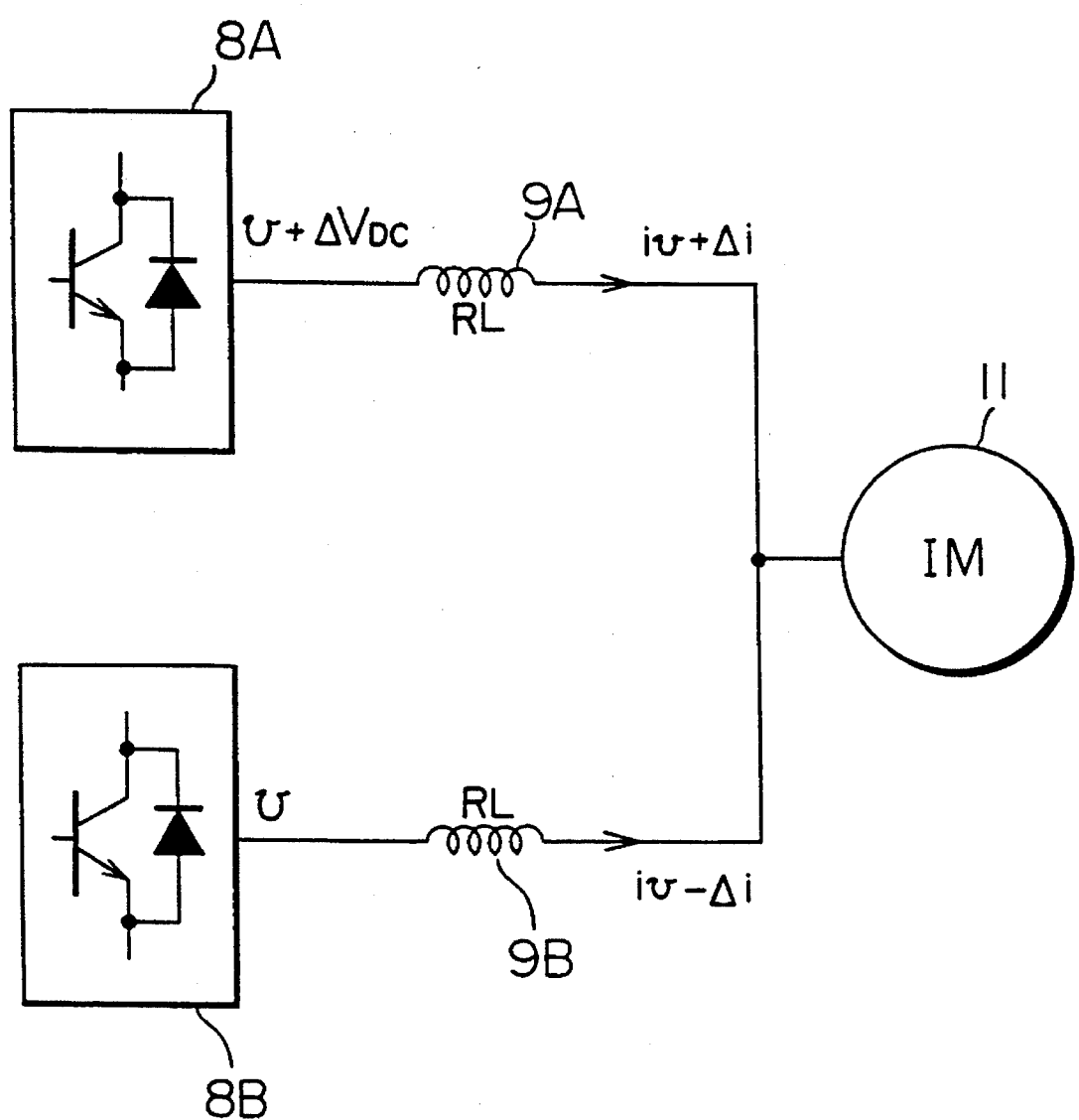
FIG. 3 is a schematic diagram for showing the relation between a current and voltage which occurs when the system of the first embodiment performs parallel operation.

FIG. 3 shows the relation among currents and voltages at various portions, which will be found when an offset voltage $\Delta Vdc$ occurs between the output voltages of the inverters 8A and 8B due to an offset voltage occurring in the control system during parallel operation of two inverters 8A and 8B having the same capacity. Because resistances $R_L$ of the reactors 9A and 9B are small, if the offset voltage $\Delta Vdc$ is generated, then a circulating current $\Delta i$ occurs through the inverters 8A and 8B, as shown in the following equation:

$$\Delta i = \Delta Vdc / 2R_L$$

As a result, currents flowing in phase V of the inverters 8A and 8B are given by $\Delta i + i_V$ and $\Delta i - i_V$, respectively.

In the elevator speed control system shown in FIG. 2, the control is carried out by extracting the excitation current component $i_d$ and the torque current component $i_q$ from three-phase current, therefore the circulating current $\Delta i$ is controlled after it is divided into two AC components $\Delta i_d$ and $\Delta i_q$ described as:

$$\Delta i_d = (\sqrt{2/3}) \cdot \cos(\theta + 2\pi/3) \cdot \Delta i$$

$$\Delta i_q = (\sqrt{2/3}) \cdot \cos(\theta + 2\pi/3) \cdot \Delta i$$

In general, a control system of excitation current and torque current has rather low gain in a higher frequency range so as to obtain stability. Therefore, as frequency of the output currents of the inverters 8A and 8B increase, the response of the control system of excitation current and torque current decreases because of the increase in frequency of the AC components $\Delta i_d$ and $\Delta i_q$, thus a problem occurs that the circulating current $\Delta i$ cannot be suppressed enough.

Furthermore, if the offset voltage $\Delta Vdc$ is generated in all three phases by the same amount, and if, as a result of this, circulating current $\Delta i$ flows in all three phases, then the AC components $\Delta i_d$ and $\Delta i_q$ are given by $$\Delta i_d = (\sqrt{2/3}) \cdot (\cos\theta + \cos(\theta + 2\pi/3) + \cos(\theta - 2\pi/3)) \cdot \Delta i$$
$$= 0$$

$$\Delta i_q = (\sqrt{2/3}) \cdot (\sin\theta + \sin(\theta + 2\pi/3) + \sin(\theta - 2\pi/3)) \cdot \Delta i$$
$$= 0$$

Thus, as seen from the above, the excitation current and torque current are not detected in this case.

As a result, the circulating current cannot be suppressed by this control system of the excitation current and torque current. That is, the transformation equation shown in equation (1) can be applied only for the case where $i_U + i_V + i_W = 0$ is satisfied. However, in reality, $i_U + i_V + i_W = \Delta i$, because of the existence of the circulating current.

Therefore, it is needed to apply the following equation (2) instead of equation (1) to transformation from three-phase current to two-phase current.

$$\begin{pmatrix} i_d \\ i_q \\ i_o \end{pmatrix} = \sqrt{2/3} \begin{pmatrix} \cos\theta & \cos(\theta+2\pi/3) & \cos(\theta-2\pi/3) \\ \sin\theta & \sin(\theta+2\pi/3) & \sin(\theta-2\pi/3) \\ \sqrt{2} & \sqrt{2} & \sqrt{2} \end{pmatrix} \begin{pmatrix} i_u \\ i_v \\ i_w \end{pmatrix} \quad (2)$$

where $i_O$ is what is called zero-phase current which is null when three-phase currents are balanced with each other. If $i_U + i_V + i_W = \Delta i$ is substituted in equation (2), then we can get $$i_O = \Delta i.$$

This means that the current due to the DC offset in the inverter output voltages is given as the zero-phase current $i_O$. It can be seen that the reduction of this current can be achieved by performing the control so that the zero-phase current $i_O$ may be null. Furthermore, because zero-phase current $i_O$ has only DC component independent of the output frequency of the inverters 8A and 8B, current control can be easily achieved.

Figure 4:
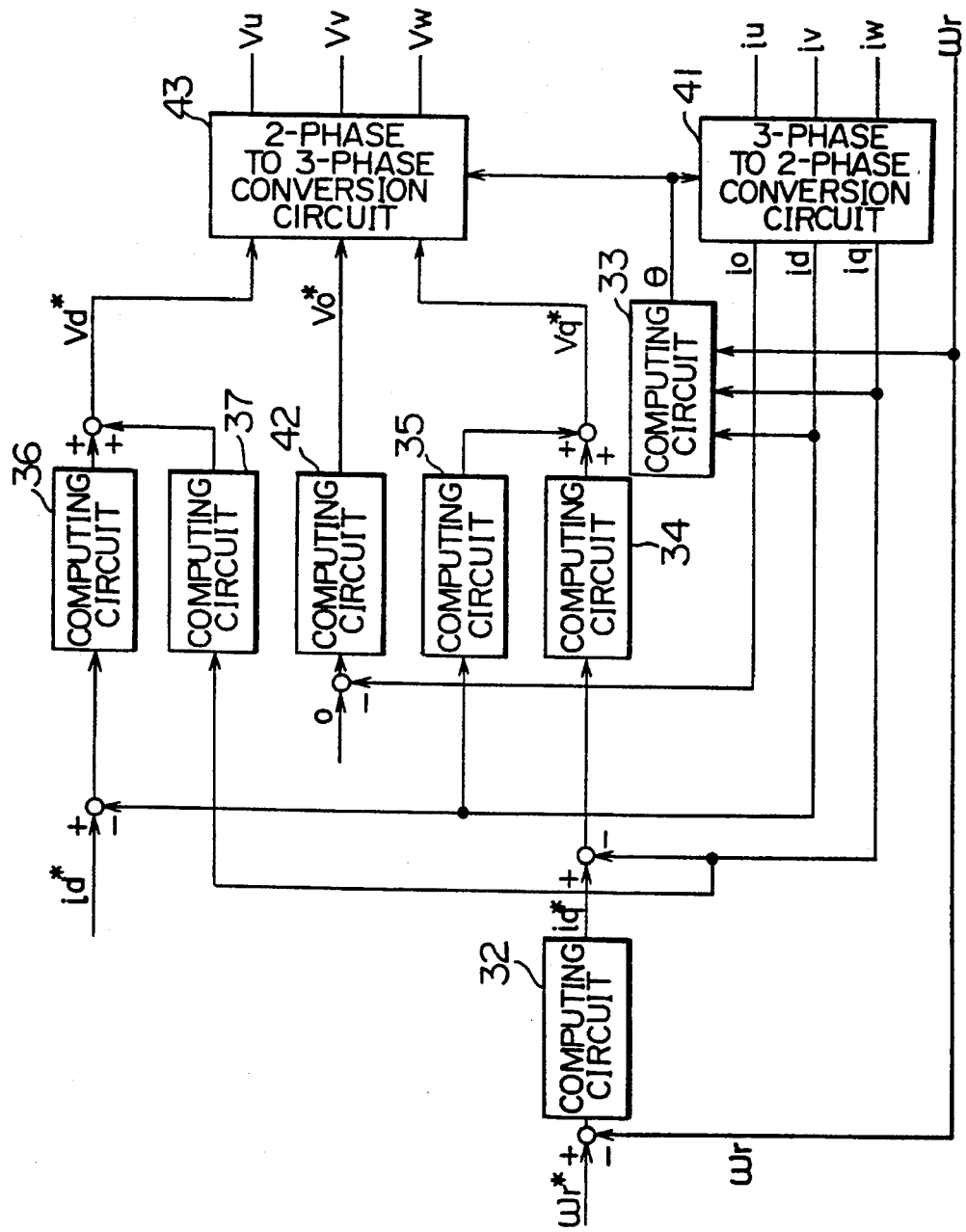
FIG. 4 is a block diagram showing calculation performed in the first embodiment.

FIG. 4 shows an example of a control system which includes a control system for the above zero-phase current. In FIG. 4, a 3-phase-to-2-phase conversion circuit 41 for performing 3-phase-to-2-phase conversion by using the relation that $i_U + i_V + i_W = 0$ to determine the excitation current component $i_d$, the torque current component $i_q$, and the zero-phase current component $i_O$.

The calculated zero-phase current component $i_O$ is fed as a feedback signal to a computing circuit 42, where a zero-phase voltage instruction $v_O^*$ is produced. The resulting zero-phase voltage instruction $v_O^*$ is applied to a 2-phase-to-3-phase conversion circuit 43 for performing 2-phase-to-3-phase conversion, thus, the zero-phase current is reduced.

In this way, in accordance with the first embodiment, the circulating current through the inverters 8A and 8B connected in parallel can be suppressed, thus the reduction of output is avoided.

The microcomputer 23 determines the zero-phase current by calculating the sum of the outputs of the current detectors 20A and 20B which are provided in each phase of the inverters 8A and 8B, then the microcomputer 23 controls the outputs of the inverters 8A and 8B so that the above zero-phase current may be minimized.

Figure 5:
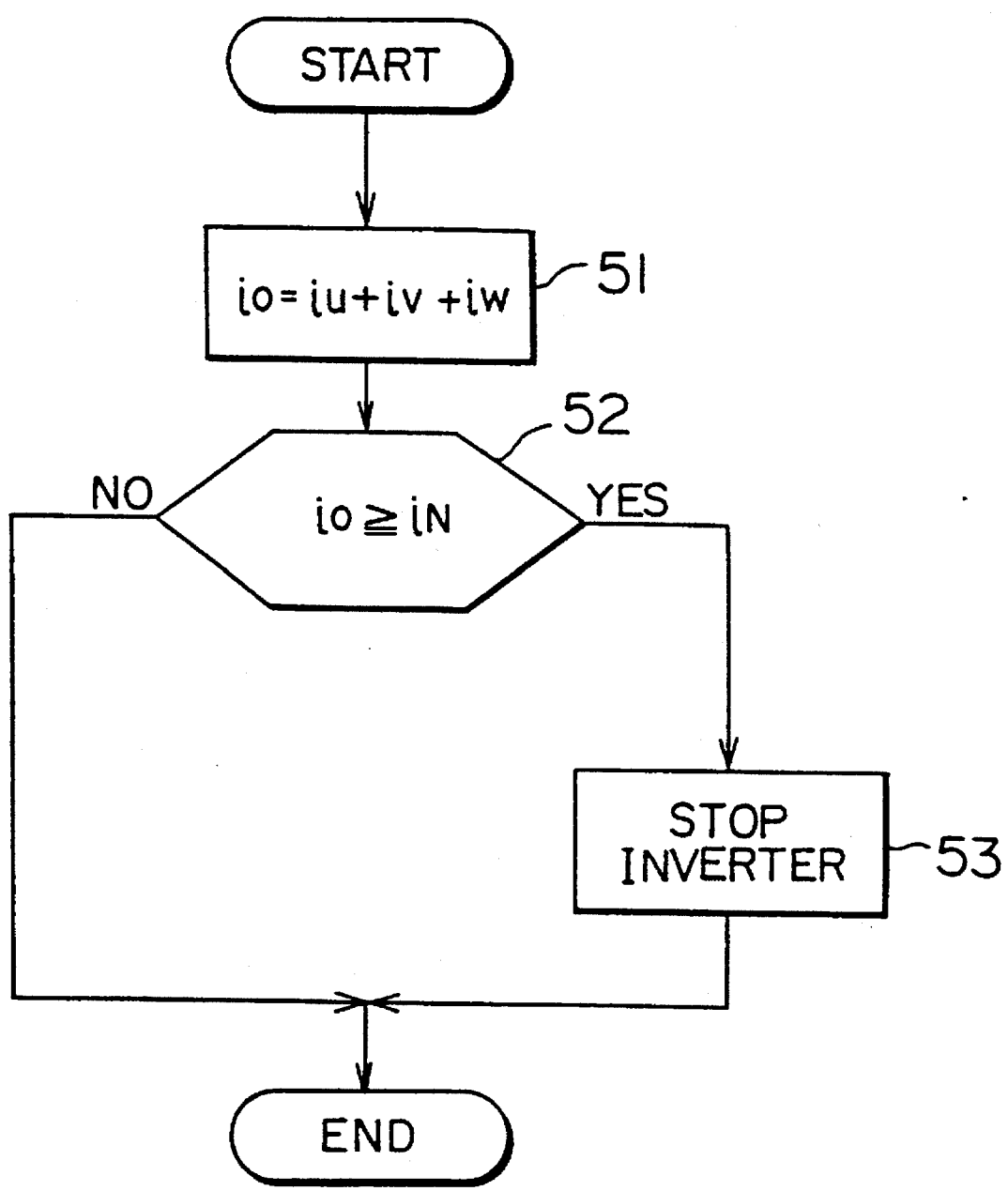
FIG. 5 is a flowchart showing operation in a second embodiment.

SECOND EMBODIMENT:

When the zero-phase current $i_O$ determined by the 3-phase-to-2-phase conversion circuit 41 shown in FIG. 4 is too large, the output of the inverters 8A and 8B will be reduced so much that an elevator may not be accelerated. Such a problem can be avoided by performing computation shown in a flowchart of FIG. 5, whose steps will be described below.

In step 51, the zero-phase current $i_O$ is determined by calculating the sum of the three phase currents.

In step 52, the determined zero-phase current $i_O$ is compared with a reference value $i_N$. This reference value $i_N$ is set to a value in a range of 20–30% of the rated current. If the zero-phase current $i_O$ reaches the reference value $i_N$, the inverters 8A and 8B will be stopped in step 53.

THIRD EMBODIMENT:

In addition to the zero-phase current discussed above, another type circulating current may flow through the inverters 8A and 8B driven in parallel. When phases of output voltages of the inverters 8A and 8B driven in parallel are denoted by $\theta$ and $\theta+\Delta\theta$, respectively, a circulating current $\Delta i_U$ which may flow in phase U can be described by:

$$\Delta i_U = V_U((\sin\theta - \sin(\theta+\Delta\theta))/2L) \cdot d\theta/dt$$

Unfortunately, this current $\Delta i_U$ cannot be distinguished from the load current, because the same amount of currents $\Delta i_U$ flow in all three phases U, V, and W. If this type circulating current occurs, the outputs of the inverters decrease depending on the amount of the current, and sufficient acceleration of an elevator is not possible.

In the configuration shown in FIG. 1, the inverters 8A and 8B are controlled by the microcomputer 23, and the phase angles of the output voltages of the inverters 8A and 8B are always measured, thus these phase angles can be easily compared. The output voltages of the inverters 8A and 8B are described by:

$$\vec{V}_1 = \vec{V}d_1 + \vec{V}q_1$$

$$\vec{V}_2 = \vec{V}d_2 + \vec{V}q_2$$

If the phase difference between the output voltages of the inverters 8A and 8B is denoted by $\Delta\theta$, then $V_2$ can be described in terms of coordinates $d_1$ and $q_1$ as follows:

$$V_2 = (Vd_2\cos\Delta\theta + Vq_2\sin\Delta\theta) + j(Vq_2\cos\Delta\theta - Vd_2\sin\Delta\theta)$$

On the other hand, the phase difference $\Delta V$ of the output voltages of the inverters 8A and 8B can be described by:

$$\Delta V = (V_1^2 + V_2^2)^{1/2}$$

Considering the fact that both the inverters 8A and 8B have approximately the same magnitude in their output currents, it can be assumed that they also have approximately the same magnitude in their output voltages, thus the following equations can be obtained:

$$Vd_1 \doteq Vd_2$$

$$Vq_1 \doteq Vq_2$$

$$\Delta\theta \doteq 0$$

Thus, the phase difference $\Delta V$ is given by $$\Delta V = (Vd_1^2 + Vq_2^2)^{1/2} \times \Delta\theta$$

As can be seen from the above, the voltage difference between the inverters 8A and 8B is approximately proportional to the magnitude and phase difference of the output voltage. Because the magnitude of the circulating current is proportional to this voltage difference, it is possible to configure the system in such a manner that the inverters 8A and 8B may be stopped when the phase difference exceeds a predetermined value.

Figure 6:
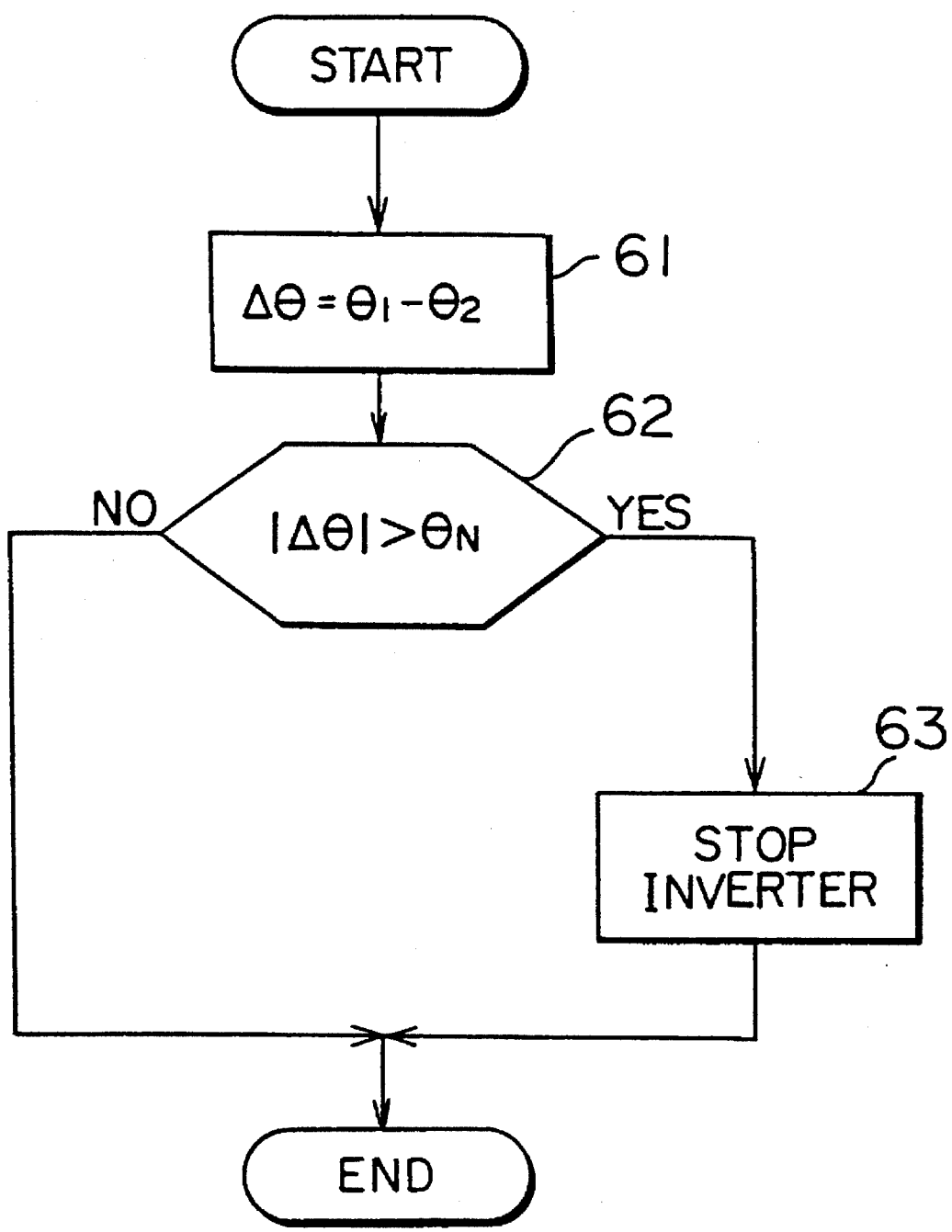
FIG. 6 is a flowchart showing operation in a third embodiment.

FIG. 6 is a flowchart showing the steps for the above calculations. Each step will be described below.

In step 61, the phase difference $\Delta\theta$ is determined from the phases $\theta_1$ and $\theta_2$ of the output voltages of the inverters 8A and 8B.

In step 62, the resultant phase difference $\Delta\theta$ is compared with a predetermined value $\theta_N$. If the phase difference $\Delta\theta$ is larger than the predetermined value $\theta_N$, the inveters 8A and 8B will be stopped in step 63.

In each embodiment described above, although only inverters 8A and 8B are discussed, similar control may be also performed for the converters 5A and 5B. Control may by done either only for inverters or for converters, or otherwise, as a matter of course, a more effective result may be achieved by controlling both the inverters and converters.

What is claimed is:

1. An elevator speed control system including:

a plurality of converters directly connected in parallel for converting an AC voltage to a DC voltage by means of controllable devices;

a capacitor for smoothing output voltages of the plural converters;

a plurality of inverters connected in parallel for converting the voltages smoothed by means of said capacitor to an AC voltage whose magnitude and frequency are controllable, and for further supplying said resulting AC voltage to a hoisting induction motor;

current detectors for detecting currents in each phase of said plural inverters; and a control means for calculating the sum of the currents of each inverter detected by said current detectors, the sum being designated as a zero-phase current $i_o$, and for further controlling the output voltages of said plurality of inverters so that the zero-phase current is minimized, the zero phase current being independent of the output frequency of the inverters.

2. An elevator speed control system as defined in claim 1 wherein said control means stops said plurality of inverters when the sum of the currents in each phase of said plurality of inverters detected by said current detectors exceeds a predetermined value, the predetermined value being set for stopping said plurality of inverters when suppression of circulating currents within said plurality of inverters will substantially reduce acceleration of the hoisting induction motor.

3. An elevator speed control system including:

a plurality of converters connected in parallel for converting an AC voltage to a DC voltage by means of controllable devices;

a capacitor for smoothing the DC output voltage of said plurality converters;

a plurality of inverters connected in parallel for converting the DC voltage smoothed by said capacitor to an AC voltage whose magnitude and frequency are controllable, and for further supplying the resulting AC voltage to a hoisting induction motor;

a control means for calculating a voltage phase difference between said plurality of inverters and for further stopping said plurality of inverters when the voltage phase difference exceeds a predetermined value, the predetermined value being set for stopping said plurality of inverters when suppression of circulating currents within said plurality of inverters will substantially reduce acceleration of the hoisting induction motor.

* * * * *